United States Patent
Lim et al.

(10) Patent No.: US 10,507,758 B2
(45) Date of Patent: Dec. 17, 2019

(54) HEADLAMP APPARATUS FOR VEHICLE

(71) Applicants: Hyundai Motor Company, Seoul (KR); Kia Motors Corporation, Seoul (KR)

(72) Inventors: Jung Wook Lim, Seoul (KR); Seung Hyeok Chang, Gyeonggi-do (KR); Ki Hong Lee, Seoul (KR); Byoung Suk Ahn, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/952,794

(22) Filed: Apr. 13, 2018

(65) Prior Publication Data
US 2019/0176683 A1  Jun. 13, 2019

(30) Foreign Application Priority Data
Dec. 8, 2017 (KR) .................. 10-2017-0168660

(51) Int. Cl.
*B60Q 1/08* (2006.01)
*F21S 41/36* (2018.01)
*B60Q 1/00* (2006.01)
*F21S 41/25* (2018.01)

(52) U.S. Cl.
CPC ............. *B60Q 1/08* (2013.01); *B60Q 1/0023* (2013.01); *F21S 41/25* (2018.01); *F21S 41/36* (2018.01); *B60Q 2300/056* (2013.01); *B60Q 2300/42* (2013.01)

(58) Field of Classification Search
CPC ...................................... B60Q 1/08
See application file for complete search history.

(56) References Cited

FOREIGN PATENT DOCUMENTS

KR  2009-0096994 A   9/2009
WO  WO-2015033764 A1 * 3/2015 ............. B60Q 1/085

* cited by examiner

*Primary Examiner* — Sean P Gramling
*Assistant Examiner* — Keith G. Delahoussaye
(74) *Attorney, Agent, or Firm* — Mintz Levin Cohn Ferris Glovsky and Popeo, P.C.; Peter F. Corless (57) ABSTRACT

A vehicle lamp apparatus is provided that forms a dark portion on an opponent vehicle within a light-irradiated region of a headlamp to prevent glare. The irradiated regions of the headlamp and an infrared light lamp are matched to more accurately match a dark portion forming region with the opponent vehicle.

7 Claims, 6 Drawing Sheets

HEADLAMP APPARATUS FOR VEHICLE

CROSS REFERENCE TO RELATED APPLICATION

The present application claims priority of Korean Patent Application No. 10-2017-0168660 filed on Dec. 8, 2017, the entire contents of which is incorporated herein for all purposes by this reference.

BACKGROUND

Field of the Disclosure

The present disclosure relates to a lamp apparatus for a vehicle, and more particularly, to a lamp apparatus that forms a dark portion on an opponent vehicle located within a light-irradiated region of a headlamp, thus preventing glare to a driver of the opponent vehicle, and minimizing a dark portion forming region, thus improving light efficiency.

Description of the Related Art

Generally, a vehicle headlamp irradiates light in a driving direction of a vehicle to illuminate a forward path, and thus irradiates the light to the front of the vehicle when the vehicle is being during poor or dark lighting conditions to provide visual information to a driver. Accordingly, by securing a front view at night or otherwise poor lighting conditions, it is possible to identify other vehicles and obstacles on the road, thus improving driving safety. Recently, a structure that controls a bright portion and a dark portion with respect to the irradiated light is applied to prevent glare to an opponent vehicle. For example, a night vision system has been applied to the vehicle, and thus an infrared light lamp projects infrared light to the front of the vehicle, and a camera installed in the vehicle records or other captures a reflected image therefrom.

However, by consisting of an infrared light lamp other than a headlamp, the overall costs increase and by installing the headlamp and the infrared light lamp in different locations, it is difficult to form an exact dark portion in accordance with a location of the opponent vehicle.

The foregoing is intended merely to aid in the understanding of the background of the present disclosure, and is not intended to mean that the present disclosure falls within the purview of the related art that is already known to those skilled in the art.

SUMMARY

The present disclosure provides a lamp apparatus for a vehicle that forms a dark portion with respect to an opponent vehicle within a light-irradiated region of a headlamp, thus preventing glare, and matching a dark portion forming region with the opponent vehicle.

A lamp apparatus for a vehicle in accordance with the present disclosure for achieving the object may include a first light source configured to irradiate visible light, a second light source disposed in a location different from the first light source and configured to irradiate infrared light, and a reflection unit configured to receive the visible light irradiated from the first light source and the infrared light irradiated from the second light source and reflect the input or received visible light and infrared light to change moving paths, thus adjusting the visible light and the infrared light to align onto the same path or a different path.

The first light source and the second light source may be spaced from both sides of the reflection unit around the reflection unit, and an input angle of the visible light moved from the first light source to the reflection unit and an input angle of the infrared light moved from the second light source to the reflection unit may be the same. Additionally, the first light source and the second light source may be spaced from both sides of the reflection unit around the reflection unit, the visible light irradiated from the first light source may be reflected by a first mirror to be moved to the reflection unit, and the infrared light irradiated from the second light source may be reflected by a second mirror to be moved to the reflection unit.

Further, the input angle of the visible light, irradiated from the first light source to be reflected by the first mirror and then moved to the reflection unit, and the input angle of the infrared light, irradiated from the second light source to be reflected by the second mirror and then moved to the reflection unit, may be the same. The reflection unit may include a plurality of micro-reflectors that are switched on or off based on a driving signal input to change moving paths of the visible light and the infrared light that have angles varied to be inputted.

The lamp apparatus for the vehicle may further include a projection lens into which the visible light and the infrared light reflected by the reflection unit may be input, and the input visible light and infrared light may be outwardly output. The lamp apparatus for the vehicle may further include a vehicle sensing unit configured to sense whether an opponent vehicle is present in front of the vehicle; and a controller configured to operate the reflection unit in response to receiving information from the vehicle sensing unit to confirm the opponent vehicle in front thereof, thus causing the infrared light to irradiate to the opponent vehicle and causing the visible light to irradiate to the region except for the opponent vehicle.

Additionally, the lamp apparatus may include an infrared light sensing unit configured to sense the infrared light with respect to the region irradiated by the infrared light from the second light source. The controller may include a database in which a shape of the vehicle may be pre-stored and may be configured to operate the reflection unit based on a shape of the opponent vehicle identified through the infrared light sensing unit, thus causing the infrared light to irradiate to a front windshield of the opponent vehicle and causing the visible light to irradiate to the region except for the front windshield of the opponent vehicle. The controller may further be configured to operate the reflection unit in operation of the headlamp to cause the visible light to irradiate to the light-irradiated region, and when the opponent vehicle is confirmed, to cause the infrared light to irradiate to the opponent vehicle.

The lamp apparatus for the vehicle composed of the structure described above forms the dark portion on the opponent vehicle within the light-irradiated region of the headlamp to prevent glare. Further, the irradiated regions of the headlamp and the infrared light lamp are matched, thus the dark portion forming region may be matched more accurately with the opponent vehicle.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a lamp apparatus for a vehicle in accordance with an exemplary embodiment of the present disclosure will be described with reference to the accompanying drawings.

Figure 1:
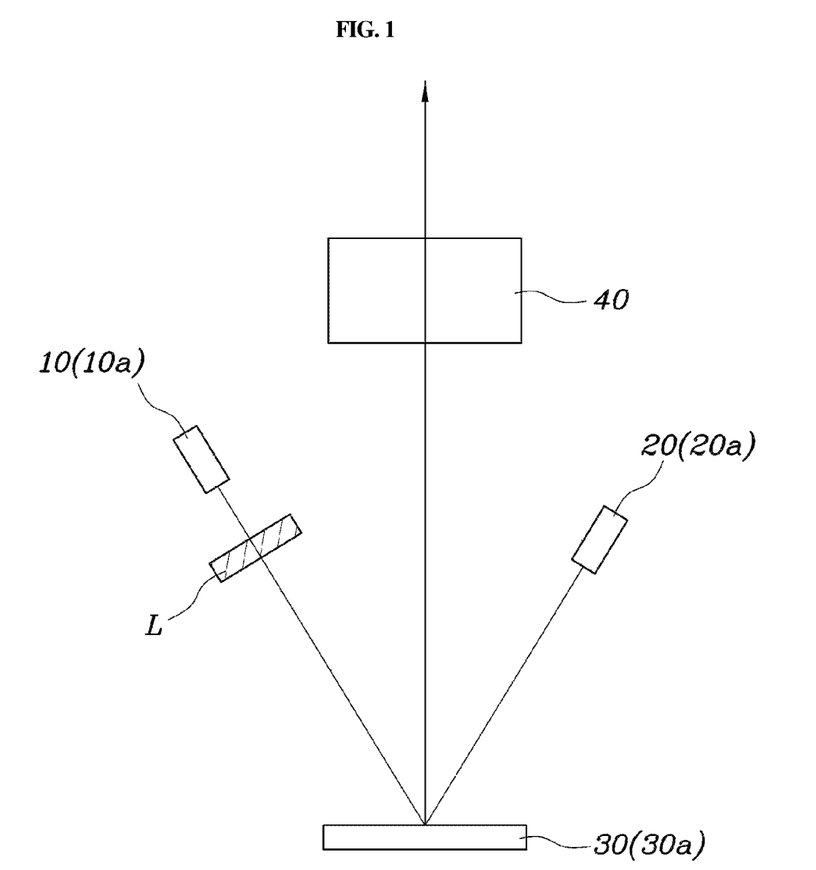
FIG. 1 is a view illustrating a lamp apparatus for a vehicle in accordance with one exemplary embodiment of the present disclosure.
Figure 2:
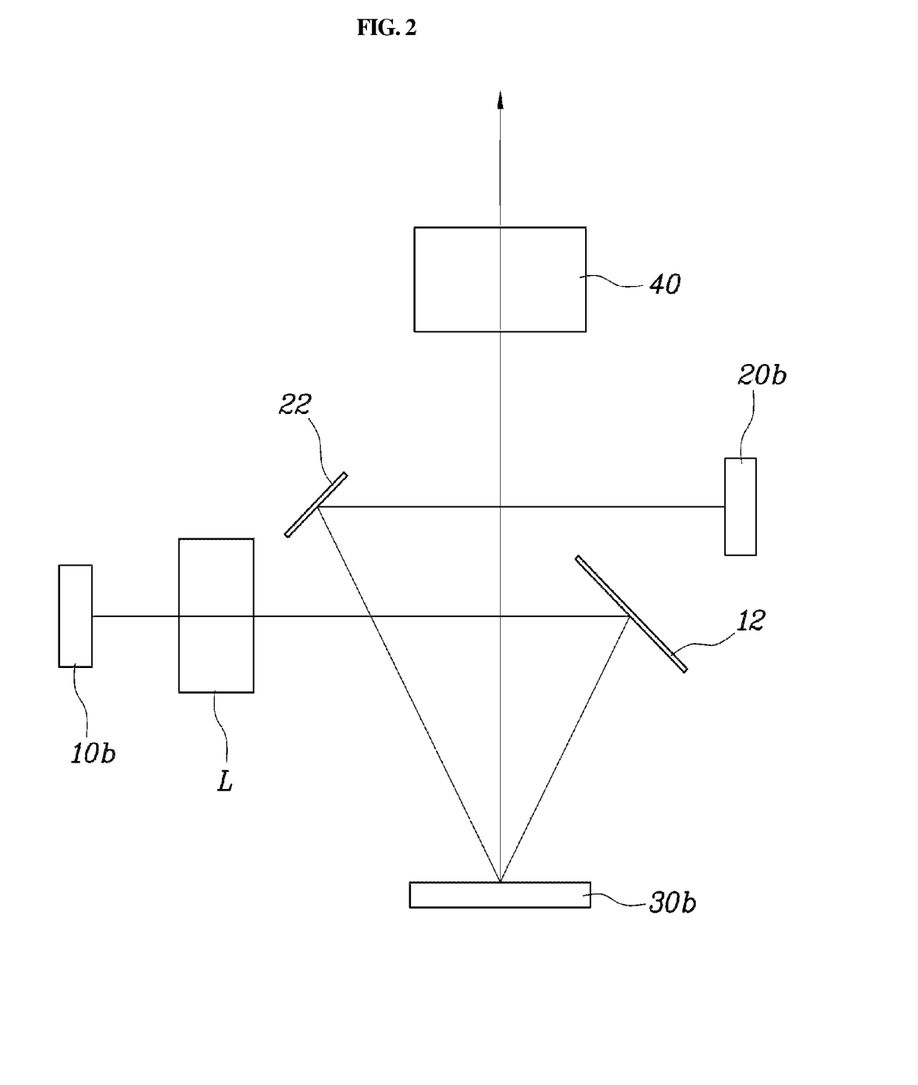
FIG. 2 is a view illustrating a lamp apparatus for a vehicle in accordance with another exemplary embodiment of the present disclosure.
Figure 3:
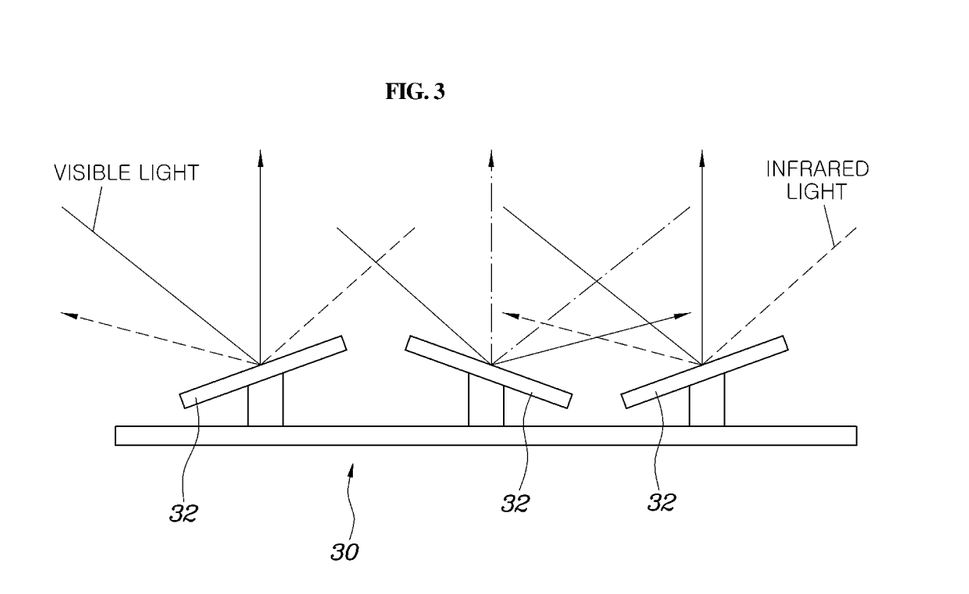
FIG. 3 is a view illustrating a reflection unit of the lamp apparatus for the vehicle in accordance with an exemplary embodiment of the present disclosure.
Figure 4:
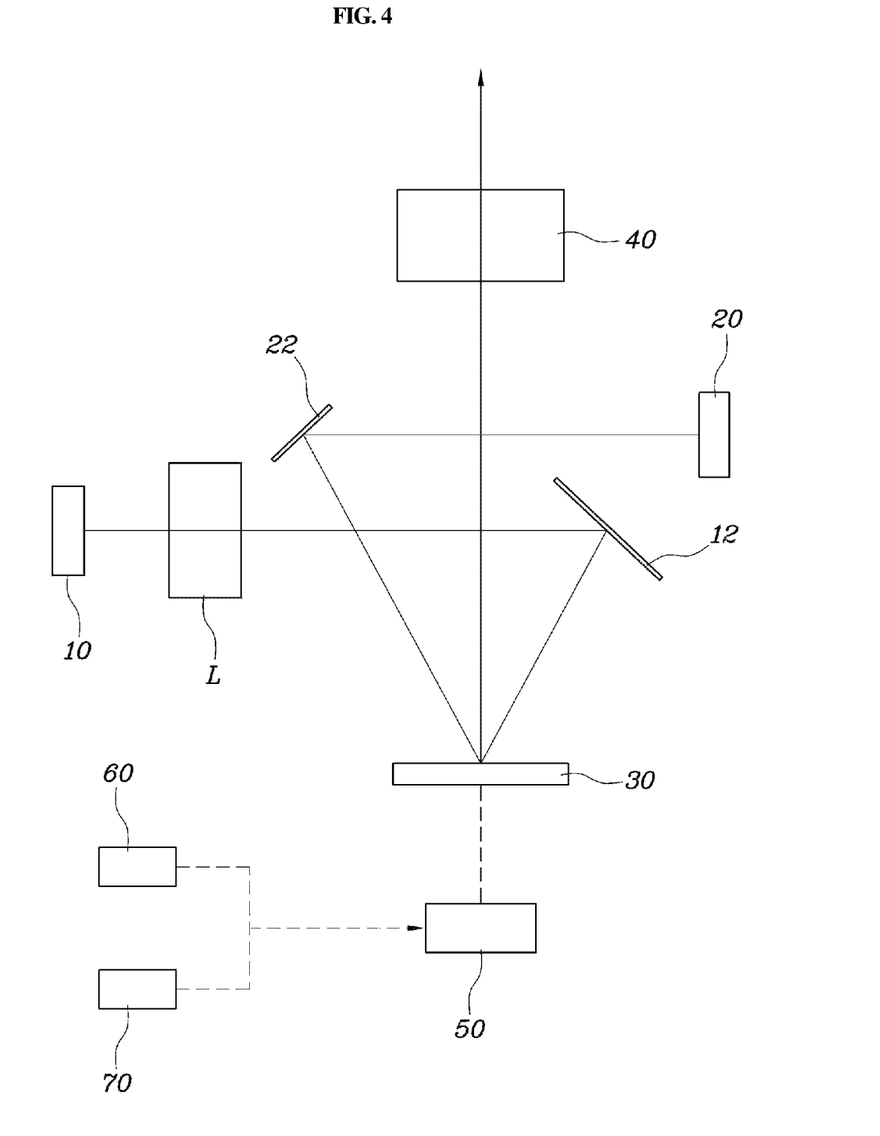
FIG. 4 is a block diagram of the lamp apparatus for the vehicle in accordance with an exemplary embodiment of the present disclosure.
Figure 5:
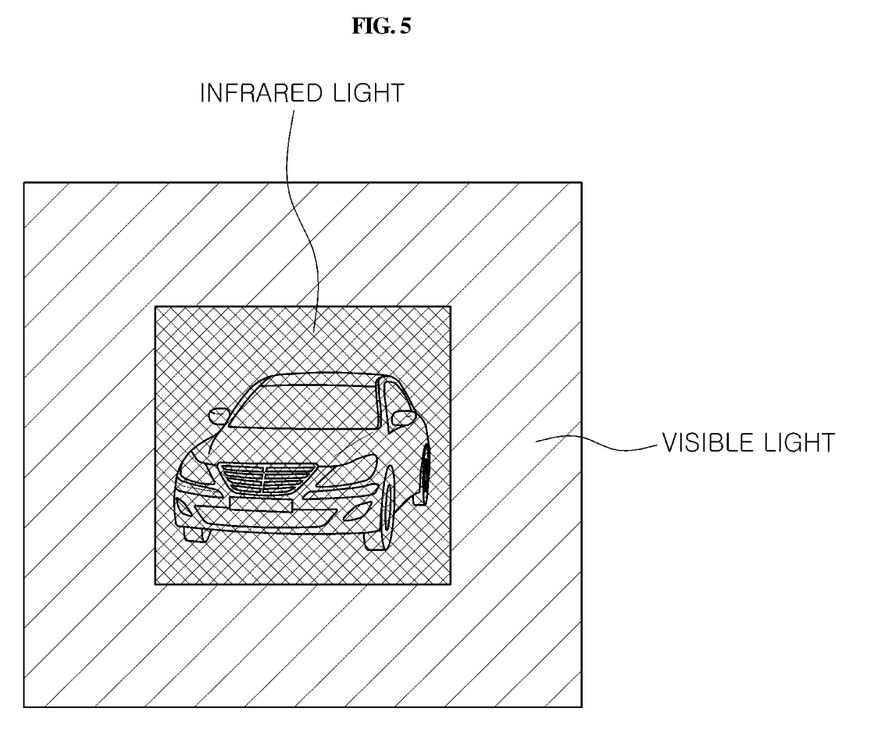
FIGS. 5 and 6 are views illustrating an operation of the lamp apparatus for the vehicle in accordance with an exemplary embodiment of the present disclosure.
Figure 6:
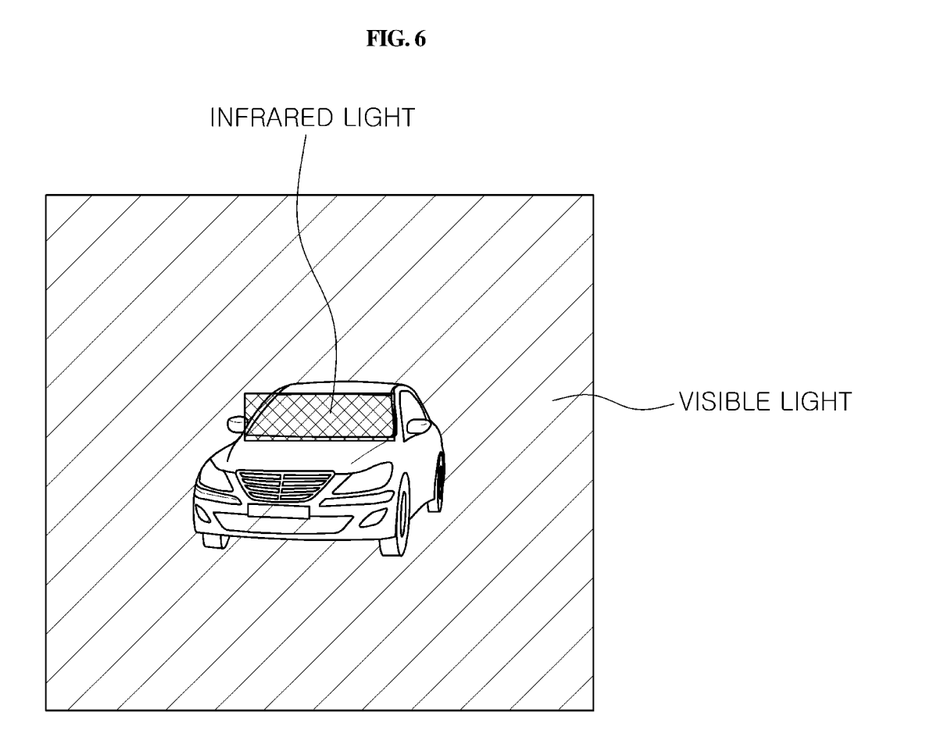

FIG. 1 is a view illustrating a lamp apparatus for a vehicle in accordance with one exemplary embodiment of the present disclosure; FIG. 2 is a view illustrating a lamp apparatus for a vehicle in accordance with another exemplary embodiment of the present disclosure; FIG. 3 is a view illustrating a reflection unit of the lamp apparatus for the vehicle in accordance with an exemplary embodiment of the present disclosure; FIG. 4 is a block diagram of the lamp apparatus for the vehicle in accordance with an exemplary embodiment of the present disclosure; and FIGS. 5 and 6 are views illustrating an operation of the lamp apparatus for the vehicle in accordance with an exemplary embodiment of the present disclosure.

A lamp apparatus for a vehicle in accordance with an exemplary embodiment of the present disclosure, as illustrated in FIGS. 1 and 2, may include a first light source 10 configured to irradiate visible light, a second light source 20 disposed in a location different from the first light source 10 and configured to irradiate infrared light, and a reflection unit 30 into which the visible light irradiated from the first light source 10 and the infrared light irradiated from the second light source 20 are input, wherein the reflection unit 30 may be configured to reflect the input visible light and infrared light to change moving paths thereof, thus causing the visible light and the infrared light to move to the same path or a different path. Thus, the first light source 10 may be configured to irradiate visible light, the second light source 20 may be configured to irradiate infrared light, and the reflection unit 30 may be configured to reflect the visible light and the infrared light irradiated from the first light source 10 and the second light source 20. The visible light and the infrared light may be moved to the same path by the reflection unit 30. The first light source 10 may concentrate the light through a separate condensing lens (L) to move the visible light to a desired path.

In particular, the reflection unit 30 may include a plurality of micro-reflection mirrors 32 that are switched on or off based on a driving signal input to change moving paths of the visible light and the infrared light having angles varied to be input. The reflection unit 30 may be composed of a Digital Micro-mirror Device (DMD); an angle of the micro-reflection mirror 32 may be adjusted by a control of switching ON/OFF to change the moving paths of the input visible light and infrared light; and a control of a motor, which adjusts the angle of the micro-reflection mirror 32 through the adjustment of a duty ratio using a pulse width modulation (PWM) control, may be performed.

Meanwhile, the present disclosure may further include a projection lens 40 into which the visible light and the infrared light reflected by the reflection unit 30 may be input, and the input visible light and infrared light may be output outwardly. The projection lens 40 may be located in the path, in which the visible light and the infrared light are reflected to be moved, in front of the reflection unit 30. In other words, the present disclosure may include an infrared light lamp within the headlamp, and conventionally, an infrared light sensor, configured to sense a headlamp irradiating the light to the front of the vehicle and surrounding objects, is located in a different location from the infrared light lamp, thus increasing layouts and also a required component. Particularly, when the headlamp and the infrared light lamp have a separate structure and are disposed at different locations, since the irradiated region of the infrared light and the light-irradiated region of the headlamp become different, locations of the surrounding objects are identified by the infrared light lamp but there is a limitation in forming an exact and precise dark portion.

Accordingly, in present disclosure, the first light source 10 irradiating the visible light for securing a front view of the vehicle and the second light source 20 irradiating the infrared light for sensing the surrounding objects are configured such that the light is irradiated toward the reflection unit 30, and the visible light irradiated from the first light source 10 and the infrared light irradiated from the second light source 20 may be moved to the same path by the reflection unit 30, thus identifying a shape of the opponent vehicle and forming a dark portion on an exact location. Further, by reflecting the visible light and the infrared light irradiated from the first light source 10 and the second light source 20 by one reflection unit 30 and thus adjusting them to the same path, it may be possible to reduce overall layouts, perform costs savings, and simplify the structure.

In particular, as illustrated in FIG. 1, a first light source 10a and a second light source 20a may be spaced from both sides of a reflection unit 30a around the reflection unit 30a, and may be disposed with an input angle of the visible light moved from the first light source 10a to the reflection unit 30a and an input angle of the infrared light moved from the second light source 20a to the reflection unit 30a being the same.

Herein, the first light source 10a and the second light source 20a are composed of one lamp module, and the visible light irradiated from the first light source 10a may be reflected by the reflection unit 30a to function as a high beam in outward irradiation. By preparing the second light source 20a irradiating the infrared light in an optical system, it may be possible to irradiate all of the visible light for securing a front view and the infrared light for identifying the surrounding objects in one lamp module. In particular, when the visible light irradiated from the first light source 10a functions as a high beam toward the front thereof by the reflection unit 30a, the infrared light irradiated from the second light source 20a may be irradiated to the region forming a dark portion. In other words, the infrared light may be irradiated to the region where the dark portion is formed in the light-irradiated region, thus identifying objects existing in the light-irradiated region.

Accordingly, the first light source 10a and the second light source 20a may be spaced from both sides thereof around the reflection unit 30a (e.g., spaced apart from each other as well as each spaced apart from one side of the reflection unit), respectively, and an input angle of the visible light moved from the first light source 10a to the reflection unit 30a and an input angle of the infrared light moved from the second light source 20a to the reflection unit 30a may be the same. In other words, in the present disclosure, the reflection unit 30a may be configured to determine a moving path of the visible light or the infrared light based on an angle of the micro-reflection mirror 32; and as illustrated in FIG. 3, when the micro-reflection mirror 32 is tilted to a first side, the visible light may be reflected to be moved to the front thereof, and when the micro-reflection mirror 32 is tilted to a second side, the infrared light may be reflected to be moved to the front thereof.

Particularly, in the micro-reflection mirror 32, since the angle varied to one side or the other side is same based on a control of switching ON/OFF, the first light source 10a and the second light source 20a may be disposed on a first side and a second side thereof around the reflection unit 30a, and become symmetric so that the input angles of the visible light and the infrared light irradiated to the reflection unit 30 are the same, thus adjusting the visible light or the infrared light, which is reflected to be moved in accordance with the angle of the micro-reflection mirror 32, to be moved to the same path. Accordingly, it is possible to use all of the visible light irradiated from the first light source 10 and the infrared light irradiated from the second light source 20, thus improving light efficiency.

Moreover, in another exemplary embodiment, as illustrated in FIG. 2, a first light source 10b and a second light source 20b may be spaced from both sides of a reflection unit 30b around the reflection unit 30b; and the visible light irradiated from the first light source 10b may be reflected by a first mirror 12 to be moved to the reflection unit 30b and the infrared light irradiated from the second light source 20b may be reflected by a second mirror 22 to be moved to the reflection unit 30b. In particular, an input angle of the visible light irradiated from the first light source 10b to be reflected by the first mirror 12 and then moved to the reflection unit 30b and an input angle of the infrared light irradiated from the second light source 20b to be reflected by the second mirror 22 and then moved to the reflection unit 30b may be the same.

As illustrated in FIG. 2, the first light source 10b and the second light source 20b may be spaced from both sides of the reflection unit 30b around the reflection unit 30b. When the first mirror 12 is disposed in the opposite side of the first light source 10b around the reflection unit 30b and the second mirror 22 is disposed in the opposite side of the second light source 20b around the reflection unit 30b, the visible light irradiated from the first light source 10b may be reflected to the first mirror 12 and then moved to the reflection unit 30b, and the infrared light irradiated from the second light source 20b may be reflected to the second mirror 22 and then moved to the reflection unit 30b. Thus, the visible light and the infrared light irradiated from the first light source 10b and the second light source 20b may cause moving paths thereof to be changed by the first mirror 12 and the second mirror 22, and angles of the vision light and infrared light input to the reflection unit 30b may be matched more easily. Additionally, by changing the light paths by the first and second mirrors 12, 22, it may be possible to adjust installed locations of the first and second mirrors 12, 22 and the reflection unit 30b to advantageously reduce layouts thereof.

However, in the micro-reflection mirror 32 having the reflection unit 30, since the angle varied to one side or the other side is same based on a control of switching ON/OFF, the input angles of the visible light and the infrared light irradiated to the reflection unit 30b by the first mirror 12 and the second mirror 22 may become symmetric to be the same, thus, causing the visible light or the infrared light, which is reflected to be moved in accordance with the angle of the micro-reflection mirror 32, to be moved to the same path.

Meanwhile, as illustrated in FIG. 4, the present disclosure may further include a vehicle sensing unit 60 configured to sense or detect whether an opponent vehicle is present in front of the vehicle (e.g., subject vehicle), and a controller 50 configured to operate the reflection unit 30 in response to receiving information from the vehicle sensing unit 60 and confirm whether the opponent vehicle is present, to thus cause the infrared light to irradiate to the opponent vehicle and cause the visible light to irradiate to the region except for the opponent vehicle. The vehicle sensing unit 60 may be an imaging device (e.g., camera, video camera, or the like) configured to photograph or obtain an image of the front of the vehicle and collect data regarding surrounding vehicles. The sensing unit 60 may also be an illumination sensor device configured to sense illumination varied under surrounding circumstances and output an illumination signal. The vehicle sensing unit 60 may be configured to collect data using the imaging device at daylight and data using the illumination sensor device at night to determine operation of the headlamp.

Thus, when the opponent vehicle is detected by the vehicle sensing unit 60, the controller 50 may be configured to receive information to operate the reflection unit 30. In other words, when the opponent vehicle is detected, the controller 50 may be configured to operate the reflection unit 30 to cause the infrared light to irradiate to the opponent vehicle and to cause the visible light to irradiate to the region except for the opponent vehicle, thus forming the dark portion in the region irradiated by the infrared light to prevent glare to a driver of the opponent vehicle and to collect information of the opponent vehicle by the infrared light.

The present disclosure may further include an infrared light sensing unit 70 sensing infrared light with respect to the region irradiated by the infrared light from the second light source 20; and the controller 50. The controller 50 may include a database in which a shape of the vehicle may be pre-stored and may be configured to operate the reflection unit 30 based on a shape of the opponent vehicle identified through the infrared light sensing unit 70, thus causing the infrared light to irradiate to a front windshield of the opponent vehicle and causing the visible light to irradiate to the region except for the front windshield of the opponent vehicle.

Particularly, the infrared light sensing unit 70 may be an infrared light camera configured to sense the light irradiated from the second light source 20 and then returned, and sense the infrared light irradiated from the second light source 20 using the infrared light sensing unit 70 to identify a shape of the vehicle. The controller 50 may be configured to collect information from the infrared light sensing unit 70 and detect a type of the opponent vehicle identified from the infrared light sensing unit 70 using the database. In other words, the pre-stored database may show a type of the vehicle based on a contour and a shape of the vehicle. Then, the controller may be configured to identify a location of the front windshield based on the type of the determined vehicle, to thus irradiate the infrared light having no glare to the front windshield of the opponent vehicle and irradiate the visible light to the region except for the front windshield. Thus, by forming the dark portion only on the front windshield of the opponent vehicle, glare to a driver of the opponent vehicle may be prevented, loss of the light intensity due to formation of an excessive dark portion may be minimized, and the light intensity capable of recognizing the front of the vehicle may be increased.

Meanwhile, the controller 50 may be configured to operate the reflection unit 30 in operation of the headlamp to cause the visible light to irradiate toward the light-irradiated region and when the opponent vehicle is confirmed, to cause the infrared light to irradiate toward the opponent vehicle. Thus, the controller 50 causes only the visible light to be irradiated toward the light-irradiated region in operation of the headlamp, thus securing the vision, and when the opponent vehicle is confirmed, causes the infrared light to be irradiated toward the opponent vehicle, thus preventing glare due to the formation of the dark portion. In addition, by irradiating the infrared light thereto, it may be possible to identify a shape of the vehicle and prevent causing glare to the opponent vehicle through the optimal procedure adjusting the dark portion on the front windshield of the corresponding vehicle, thus improving light efficiency.

Accordingly, as illustrated in FIG. 5, when the opponent vehicle is detected using the vehicle sensing unit 60, the controller 50 may be configured to operate the reflection unit 30 to cause the infrared light to be irradiated toward the opponent vehicle and to cause the visible light to be irradiated toward a region other than the opponent vehicle (e.g., a region that excludes the opponent vehicle), thus forming the dark portion on the region irradiated by the infrared light not to cause glare to the opponent vehicle and to collect information of the opponent vehicle by the infrared light. Accordingly, as illustrated in FIG. 5, the dark portion may be formed on the opponent vehicle.

Meanwhile, as illustrated in FIG. 6, when the infrared light is irradiated, the infrared light may be sensed using the infrared light sensing unit 70 to identify a shape of the vehicle; and the controller 50 may be configured to detect a type of the opponent vehicle identified from the infrared light sensing unit 70 using the pre-stored database. Thus, when a type of the opponent vehicle is detected, the controller 50 may be configured to identify a location of the front windshield based on the type of the detected vehicle, thus causing the infrared light having no glare to be irradiated toward the front windshield of the opponent vehicle and causing the visible light to be irradiated toward the region except for the front windshield. Thus, as illustrated in FIG. 6, by forming the dark portion only on the front windshield of the opponent vehicle, it may be possible not to cause glare to a driver of the opponent vehicle, minimize loss of the light intensity due to formation of an excessive dark portion, and increase the light intensity that allows recognition of the front thereof.

The lamp apparatus for the vehicle composed of the structure described above forms the dark portion on the opponent vehicle within the light-irradiated region of the headlamp to prevent glare. Further, the irradiated regions of the headlamp and the infrared light lamp may be matched, thus more accurately matching the dark portion forming region with the opponent vehicle to reduce overall layouts.

Although an exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:
1. A lamp apparatus for a vehicle, comprising:
a first light source configured to irradiate visible light;
a second light source disposed in a location different from the first light source and configured to irradiate infrared light; and
a reflection unit into which the visible light irradiated from the first light source and the infrared light irradiated from the second light source are input and configured to reflect the input visible light and infrared light to change moving paths, thus adjusting the visible light and the infrared light to the same path or a different path,
wherein the first light source and the second light source are respectively spaced apart from a first side and a second side of the reflection unit around the reflection unit, and an input angle of the visible light moved from the first light source to the reflection unit and an input angle of the infrared light moved from the second light source to the reflection unit are identical,
wherein the reflection unit includes a plurality of micro-reflection mirrors that are switched on or off based on a driving signal input to change moving paths of the visible light and the infrared light that have angles varied between the first side and the second side,
wherein the reflection unit is configured to determine a moving path of the visible light and the infrared light based on an angle of each of the plurality of micro-reflection mirrors,
wherein when at least one of the plurality of the micro-reflection mirrors is tilted to the first side, the visible light is reflected to be moved to the front of the reflection unit, wherein when at least one of the plurality of the micro-reflection mirrors is tilted to the second side, the infrared light is reflected to be moved to the front of the reflection unit, and where each of the micro-reflection mirrors is tilted either to the first side or to the second side at a same angle by being switched on or off based on the driving signal input, such that the visible light and the infrared light which are reflected in accordance with the tilted angles of the micro-reflection mirrors are adjusted to be moved to the same path.

2. The lamp apparatus for the vehicle according to claim 1, further comprising:
a projection lens into which the visible light and the infrared light reflected by the reflection unit are input, and the input visible light and infrared light are output outwardly.

3. The lamp apparatus for the vehicle according to claim 1, wherein the first light source and the second light source are spaced from both sides of the reflection unit around the reflection unit, the visible light irradiated from the first light source is reflected by a first mirror to be moved to the reflection unit, and the infrared light irradiated from the second light source is reflected by a second mirror to be moved to the reflection unit.

4. The lamp apparatus for the vehicle according to claim 3, wherein an input angle of the visible light, which is irradiated from the first light source to be reflected by the first mirror and then moved to the reflection unit, and an input angle of the infrared light, which is irradiated from the second light source to be reflected by the second mirror and then moved to the reflection unit, are identical.

5. The lamp apparatus for the vehicle according to claim 1, further comprising:
a vehicle sensing unit configured to detect whether an opponent vehicle is present in front of the vehicle; and
a controller configured to operate the reflection unit in response to receiving information from the vehicle sensing unit to identify the opponent vehicle in front thereof, thus causing the infrared light to be irradiated toward the opponent vehicle and causing the visible light to be irradiated toward a region except for the opponent vehicle.

6. The lamp apparatus for the vehicle according to claim 5, further comprising:
an infrared light sensing unit configured to sense the infrared light with respect to the region irradiated by the infrared light from the second light source,
wherein the controller includes a database in which a shape of the vehicle is pre-stored, and the controller is configured to operate the reflection unit based on a shape of the opponent vehicle identified through the infrared light sensing unit, thus causing the infrared light to be irradiated toward a front windshield of the opponent vehicle and causing the visible light to be irradiated toward a region except for the front windshield of the opponent vehicle.

7. The lamp apparatus for the vehicle according to claim 5, wherein the controller is configured to operate the reflection unit during operation of a headlamp to cause the visible light to be irradiated toward the light-irradiated region, and when the opponent vehicle is detected, to cause the infrared light to be irradiated toward the opponent vehicle.

* * * * *